United States Patent
Boutnaru

(10) Patent No.: US 11,363,046 B2
(45) Date of Patent: *Jun. 14, 2022

(54) NETWORK OPERATION APPLICATION MONITORING

(71) Applicant: PayPal, Inc., San Jose, CA (US)

(72) Inventor: Shiomi Boutnaru, Modiin (IL)

(73) Assignee: PayPal, Inc., San Jose, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/876,306

(22) Filed: May 18, 2020

(65) Prior Publication Data
US 2020/0351289 A1 Nov. 5, 2020

Related U.S. Application Data

(63) Continuation of application No. 15/197,387, filed on Jun. 29, 2016, now Pat. No. 10,659,481.

(51) Int. Cl.
*G06F 15/173* (2006.01)
*H04L 9/40* (2022.01)

(52) U.S. Cl.
CPC ...... *H04L 63/1425* (2013.01); *H04L 63/1416* (2013.01)

(58) Field of Classification Search
None
See application file for complete search history.

(56) References Cited

U.S. PATENT DOCUMENTS

| 8,429,748 B2 | 4/2013 | Suit et al. |
| 8,635,697 B2 | 1/2014 | McNamee et al. |

(Continued)

FOREIGN PATENT DOCUMENTS

| CN | 102123076 A | 7/2011 |
| EP | 2343864 A2 | 7/2011 |

(Continued)

OTHER PUBLICATIONS

International Search Report and Written Opinion dated Sep. 14, 2017, in PCT Application No. PCT/US2017/039830 filed Jun. 28, 2017, pp. 1-15.
Extended European Search Report from European Patent Application No. EP 17821189.2, dated Nov. 11, 2019, pp. 1-8.
Extended European Search Report from European Patent Application No. EP 20196734.6, dated Oct. 9, 2020, pp. 1-8.

*Primary Examiner* — Brian Whipple
*Assistant Examiner* — Gregory P Tolchinsky
(74) *Attorney, Agent, or Firm* — Haynes and Boone, LLP

(57) ABSTRACT

Systems and methods that determine an anomaly in a network are provided. A monitoring engine is installed on a computing device that monitors network information and application information for data flows generated on the computing device and transmitted over a network and for data flows received by the computing device from the network. The network information includes an internet protocol (IP) source address, a source port, an IP destination address, a destination port, and a transport protocol, and a number of bytes sent or received by the flow. The application information includes a process identifier (ID), the threads ID, an application ID and/or a function call, arguments passed to the function, a stack trace of the function, etc., that application used to generate the data flows. The network information and application information can be used to identify the application, thread and/or a function that caused an anomaly in the network.

20 Claims, 7 Drawing Sheets

400

(56) References Cited

U.S. PATENT DOCUMENTS

| | | |
|---|---|---|
| 9,542,655 B1 | 1/2017 | Chernis et al. |
| 2005/0207413 A1 | 9/2005 | Lerner |
| 2006/0242694 A1 | 10/2006 | Gold et al. |
| 2007/0043861 A1 | 2/2007 | Baron et al. |
| 2008/0034425 A1 | 2/2008 | Overcash et al. |
| 2008/0222717 A1 | 9/2008 | Rothstein et al. |
| 2009/0138858 A1 | 5/2009 | Livshits et al. |
| 2009/0245109 A1 | 10/2009 | Hurley et al. |
| 2010/0071061 A1 | 3/2010 | Crovella et al. |
| 2010/0228650 A1* | 9/2010 | Shacham ............ G06F 16/2455 705/34 |
| 2011/0173490 A1 | 7/2011 | Narayanaswamy et al. |
| 2011/0246640 A1 | 10/2011 | Saha et al. |
| 2012/0317306 A1 | 12/2012 | Radinsky et al. |
| 2013/0042323 A1 | 2/2013 | Narayanaswamy et al. |
| 2013/0160119 A1 | 6/2013 | Sartin et al. |
| 2013/0347103 A1 | 12/2013 | Veteikis et al. |
| 2014/0157405 A1 | 6/2014 | Joll et al. |
| 2014/0189861 A1 | 7/2014 | Gupta et al. |
| 2015/0074267 A1 | 3/2015 | Manning et al. |
| 2015/0341379 A1 | 11/2015 | Lefebvre et al. |
| 2015/0358344 A1 | 12/2015 | Mumcuoglu et al. |
| 2017/0026395 A1 | 1/2017 | Mumcuoglu et al. |
| 2017/0026398 A1 | 1/2017 | Mumcuoglu et al. |
| 2017/0104658 A1 | 4/2017 | Sykes |
| 2018/0367556 A1 | 12/2018 | Mumcuoglu et al. |

FOREIGN PATENT DOCUMENTS

| | | |
|---|---|---|
| EP | 2946332 A1 | 11/2015 |
| IL | 238474 A | 7/2019 |
| IL | 262866 A | 7/2019 |
| WO | 2014111863 A1 | 7/2014 |

* cited by examiner

NETWORK OPERATION APPLICATION MONITORING

CROSS-REFERENCE TO RELATED APPLICATIONS

This application is a Continuation of U.S. patent application Ser. No. 15/197,387, filed on Jun. 29, 2016, the entire disclosure of which is incorporated herein by reference in its entirety.

TECHNICAL FIELD

The disclosure generally relates to monitoring networks, and more specifically to identifying applications which cause anomalies (performance and security related) in the networks.

BACKGROUND

Network monitoring tools monitor communications that occur in a network. For example, network monitoring tools may monitor network information, such as an Internet Protocol (IP) source address, IP destination address, transport protocol (like TCP or UDP) source port, destination port and number of bytes sent/received. As computing devices create network communication data that travels through the network, the network monitoring tools collect and store this network information at predefined time intervals. However, while network monitoring tools monitor network communications between computing devices, network monitoring tools do not monitor applications within the computing device that cause the computing device to generate the network communication data. As a result, when an anomaly in the network occurs, conventional network monitoring tools may identify a computing device that causes the anomaly but not applications which generate the network communications data.

This lack of transparency may create issues ranging from computing device security to computing device performance. For instance, when conventional network monitoring tools identify an anomaly in the network due to a cyber-attack or an application that can be traced to a particular computing device in the network, there is not a way to identify which application on the computing device is the cause of the anomaly. Instead, a system administrator or a forensic analyst are forced to manually search through a plethora of applications executing on the computing device and try to guess and identify the application of interest. The issue is further exacerbated when the application that causes the anomaly in the network stops executing on the computing device and can no longer be identified at the time the system administrator or the network analyst search through the computing device, or when the application that causes the anomaly in the network executes for brief periods of time and uses different ports during multiple brief executions.

Figure 1:
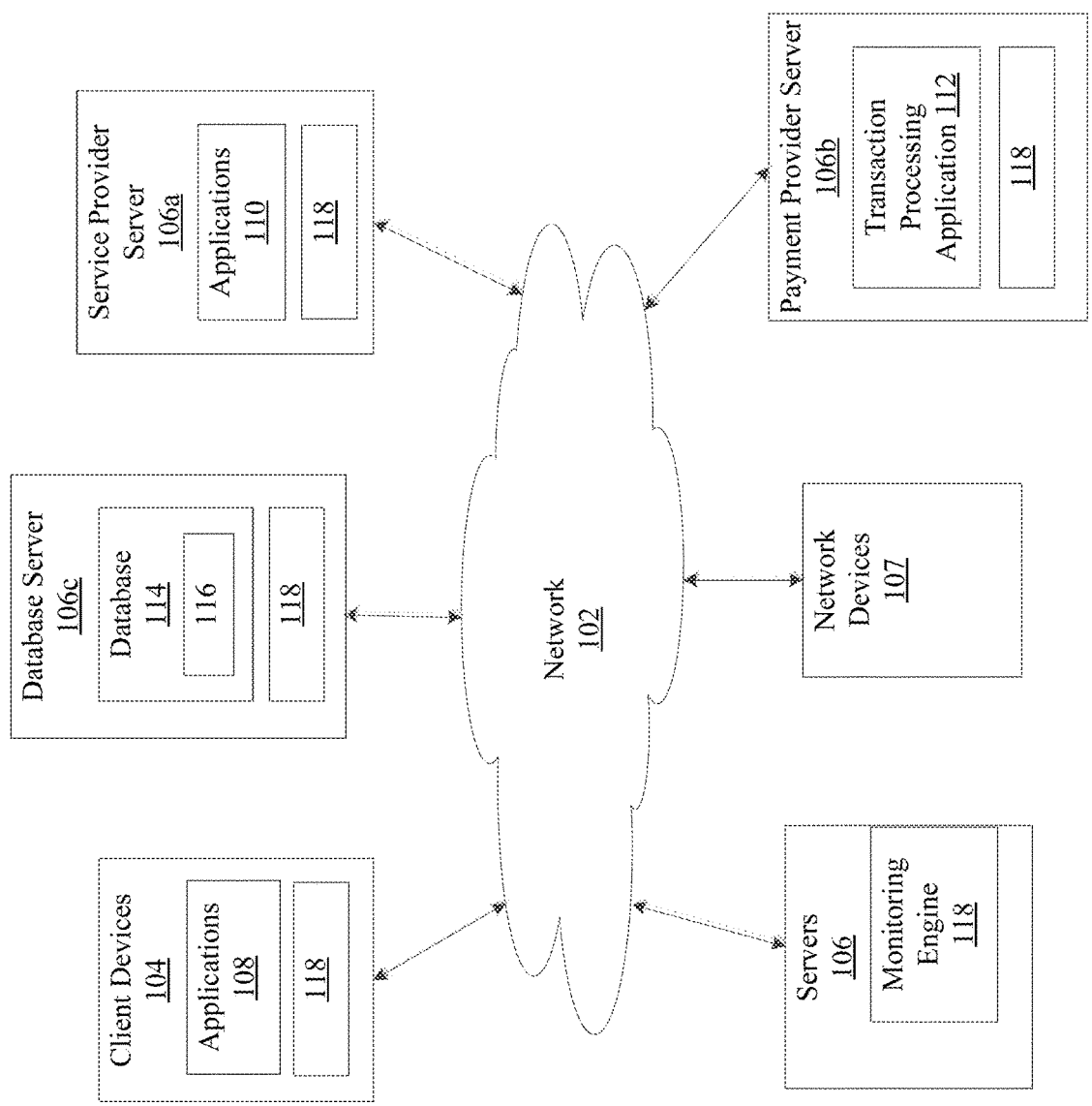
FIG. 1 is a diagram of an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The disclosure provides systems, methods, and computer program products for determining an application that creates an anomaly in a network. The embodiments describe a monitoring engine that is installed on one or more nodes, such as servers, network devices, or client devices, in a network. From each node that hosts the monitoring engine, the monitoring engine collects network information, such as an IP source address, IP destination address, source port, destination port, and transport protocol (like TCP/UDP). The network information may be generated by the node each time a node transmits or receives a flow over the network or at any given interval. A flow may be a sequence of packets that include data that is transmitted or received by one of the applications executing on the node. Additionally, from each node, the monitoring engine collects application information of the application that caused the node to transmit or receive the flow. The application information may be stored in the application stack and includes an application name, an application identifier (ID), a process ID, a thread ID, and/or function name and/or a section of the source code of the application that caused the node to generate network information for the flow and/or the current stack trace of the application while generating the network traffic. In some embodiments, the monitoring engine also collects that node's timestamp which indicates the time that the application requested the node to generate the network information.

Once the monitoring engine collects the network information, the application information, and/or the timestamp, the monitoring engine stores the collected information to identify anomalies in the network. In one embodiment, the monitoring engine may store the network information, the application information, and/or the timestamp in the memory storage of the node that is accessible to the monitoring engine. In another embodiment, the monitoring engine of each node may transmit the network information, the application information, and/or the timestamp for storage in the memory storage accessible to the master monitoring engine. The master monitoring engine may store and/or access the network information, the application information, and/or the timestamp collected by multiple monitoring engines hosted on multiple nodes.

In an embodiment, to determine an anomaly in a network, the monitoring engine may receive a request message that includes network information that is associated with the anomaly. An anomaly may be a bottleneck in the network caused by a node or flows generated as a result of a cyber-attack or other events recognized by those of ordinary skill in the art as a network anomaly. Example network information may include an IP source address, IP destination address, IP source port, and/or IP destination port, and/or transport protocol (such as TCP/UDP, which are described below) of one or more flows that generated an anomaly. Additionally, the network information may also include the time that an anomaly occurred or is currently occurring in the network. When the monitoring engine receives the request message, the monitoring engine compares the network information in the request message to the network information collected at the node by the monitoring engine at the same or approximate time. Based on the comparison, the monitoring engine identifies the network information collected at the node and then correlates the network information with the application information of the application that caused the node to generate or receive the flow. In this way, the monitoring engine identifies which application may cause an anomaly in the network.

In a further embodiment, the master monitoring engine may similarly determine an anomaly in the network. When the master monitoring engine receives a request message that includes network information associated with the anomaly, the master monitoring engine compares the network information in the request to the network information collected from multiple nodes at the same or approximate time. Based on the comparison, the master monitoring engine identifies the network information collected at the node and then correlates the network information with the application information of the application that caused the node to generate or receive the flow. In this way, the master monitoring engine identifies which application may cause an anomaly in the network.

FIG. 1 is an exemplary system 100 where embodiments can be implemented. System 100 includes a network 102, client devices 104, servers 106, and network devices 107.

In an embodiment, network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

In an embodiment, client devices 104 may be portable and non-portable electronic devices under control of a user and configured to transmit, receive, and manipulate data received from different servers 106 over network 102. Example client devices 104 include desktop computers, laptop computers, mobile devices, tablets, smartphones, wearable computing devices, eyeglasses that incorporate computing devices, implantable computing devices, etc.

Client devices 104 may include one or more applications 108. Applications 108 may be pre-installed on the client devices 104, installed on the client devices 104 using portable memory storage devices, such as compact disks or thumb-drives, or be downloaded to the client devices 104 from servers 106. Applications 108 may execute on the client devices 104 and receive instructions and data from a user, and send and transmit instructions and data to servers 106.

In an embodiment, applications 108 may provide various services to users using client devices 104. Example applications 108 installed on client devices 104 may be payment transaction applications. Payment transaction applications may be configured to transfer money world-wide, receive payments for goods and services, manage money spending, etc. Further, applications 108 may be under an ownership or control of a payment service provider, such as PAYPAL®, Inc. of San Jose, Calif., USA, a telephonic service provider, a social networking service provider, and/or other service providers. In an embodiment, applications 108 may also be analytics applications. Analytics applications perform business logic, provide services, and measure and improve performance of services and functions of other applications that execute on client devices 104 based on current and historical data. In another embodiment, applications 108 may be security applications for implementing client-side security features, programmatic client applications for interfacing with appropriate application programming interfaces (APIs) over network 102. In yet another embodiment, applications 108 may be communication applications, such as email, texting, voice, and instant messaging applications that allow a user to send and receive emails, calls, texts, and other notifications through network 102. In yet another embodiment, applications 108 may be location detection applications, such as a mapping, compass, and/or global positioning system (GPS) application. In yet another embodiment, applications 108 may be social networking applications and/or merchant applications. In yet another embodiment, applications 108 may be service applications that permit a user of client device 104 to receive, request and/or view information for products and/or services, and also permit the user to purchase the selected products and/or services.

In an embodiment, applications 108 may utilize numerous components included in client devices 104 to display, receive input, store and transmit data, and communicate other client devices 104 and servers 106 over network 102. Example components are discussed in detail in FIG. 6.

In an embodiment, server 106 may be a computer device or a software program that provides functionality to other devices in network 102, such as client devices 104. In an embodiment, a server may serve multiple client devices 104. For example, server 106 may provide services and/or data to client devices 104, store data on behalf of client devices 104, etc. Example servers 106 may include service provider servers, payment provider servers, database servers, file servers, mail servers, print servers, application servers, game servers, etc. There may be hundreds or thousands of servers connected to network 102. Example service provider server 106a, payment provider server 106b, and database server 106c are described below.

In an embodiment, service provider server 106a may provide services to multiple applications 108 that execute on client devices 104. Service provider server 106a may also be maintained by a service provider, such as PAYPAL®, a telephonic service provider, social networking service, and/or other service providers.

In an embodiment, service provider server 106a executes applications 110. Applications 110 may receive, process, and transmit data for user requested products and/or services transmitted from client devices 104. Thus, applications 110 may be financial services applications configured to transfer money world-wide, receive payments for goods and services, manage money spending, etc. In an embodiment, applications 110 may also be security applications configured to implement client-side security features or programmatic client applications for interfacing with appropriate application programming interfaces (APIs) over network 102. In another embodiment, applications 110 may be communication applications that perform email, texting, voice, and instant messaging functions that allow a user to send and receive emails, calls, texts, and other notifications over network 102. In yet another embodiment, applications 110 may be location detection applications, such as a mapping, compass, and/or GPS applications. In yet another embodiment, applications 110 may also be incorporated into social networking applications and/or merchant applications.

In an embodiment, when applications 108 transmit requests and/or data to applications 110, applications 110 process the requests and data. In a further embodiment, applications 110 may request payment from a user using application 108 to process the requests. In an embodiment, application 110 may use payment provider server 106*b* to process the payment requests. For instance, the payment provider server 106*b* may receive payment requests from applications 110, 112 that cause the payment provider server 106*b* to transfer funds of a user using application 108 to service provider associated with the service provider server 106*a*.

In an embodiment, payment provider server 106*b* includes one or more transaction or payment processing applications 112. Payment processing applications 112 facilitate transfer of funds between one or more parties, or applications, such as applications 108 and 110. In an embodiment, payment processing applications 112 may be configured to receive information from one or more applications 108, 110 executing on client devices 104 and/or service provider server 106*a* for processing and completion of financial transactions. Financial transactions may include financial information corresponding to user debit/credit card information, checking account information, a user account (e.g., payment account with a payment provider server 106*b*), or other payment information. Transaction processing application 112 may complete the financial transaction for the purchase request by providing payment to application 110 executing on service provider server 106*b*. In various embodiments, transaction processing application 112 may provide transaction histories, including receipts, to client device 104 in order to provide proof of purchase for an item and/or service.

In an embodiment, in order to complete financial transactions (or other transactions) payment provider server 106*b* (or another server 106) may store transactions in database 114. Database 114 may be a collection of tables, schemas, queries, views, etc. that are stored in memory suitable to store large quantities of data, such as a memory described in FIG. 6. In an embodiment, database 114 may be hosted on database server 106*c* and is accessible to applications 108, 110, and 112 via messages in a form of queries. In an embodiment, payment provider server 106*b* may establish user accounts 116 in database 114. Each user account 116 may be associated with one or more users using application 108 with payment provider server 106*b* to facilitate payment for goods and/or services offered by applications 110. User accounts 116 may include user information, such as name, address, birthdate, payment/funding information, travel information, additional user financial information, and/or other desired user data.

As discussed above, network 102 may also include network devices 107. Network devices 107 include routers, gateways, modems, switches, wireless access point devices, etc. In an embodiment, network devices 107 also include one or more applications that facilitate message travel and data access in network 102.

As illustrated above, client devices 104, servers 106, and network devices 107 may transmit multiple messages to each other via network 102. These messages may be generated by one or more of applications 108, 110, and 112, and are transmitted using a sequence of packets that travel from a source computing device (such as server 106 or client device 104) to a destination computing device (such as server 106 or client device 104). Another term for the sequence of packets from a source computing device to a destination computing device may be a network flow, a packet flow, a traffic flow or simply flow. Multiple flows that travel in network 102 create network communication traffic between client devices 104 and servers 106. In an embodiment, to monitor the network communication traffic, one or more client devices 104 and servers 106 may include monitoring engines 118. The monitoring engines 118 may be a software application or a piece of hardware that is installed or connected to servers 106 or client devices 104. In a further embodiment, there may be one monitoring engine 118 per client device 104 or server 106. In a further embodiment, the monitoring engines 118 may be under control of the same entity that controls server 106, such as PAYPAL®.

In an embodiment, the monitoring engine 118 may monitor network information of the flows that are transmitted and/or received by servers 106, network devices 107 and client devices 104. The monitoring engine 118 may also correlate the network information to applications that execute on servers 106, network devices 107 or client devices 104 and that generate or receive the flows. In an embodiment, to correlate the network information with the application information, the monitoring engine 118 may require access to the operating system of the client device 104, server 106, or network device 107 that hosts the application.

In an embodiment, collecting network information of the flow and application information of an application that generated the flow has numerous advantages. For example, when monitoring engine 118 or another device in network 102 detects anomalies in the flows that travel through network 102, monitoring engine 118 may not just identify which server 106, client device 104 or network device 107 causes the anomaly in the flows, but also determine the application that generated the flows. In another example, in an event of a cyber-attack (which may be a worm or any other type of malware that is propagating or spreading in network 102 in some embodiments), the monitoring engine 118 may be able to detect the application code that the worm uses/influences to unleash the cyber-attack. In an embodiment, the monitoring engine 118 may also detect the application code that the worm uses even after the worm stopped executing on server 106, client device 104, or network device 107. In another example, an application may create numerous flows in network 102 that cause a bottleneck as the flows travel through the network. When monitoring engine 118 detects the bottleneck, the monitoring engine 118 may identify which server 106, client device 104, or network device 107 is responsible for the bottleneck and also which application is causing the bottleneck, which enables detection or identification of a root cause or root application associated with the flow or anomaly.

Figure 2:
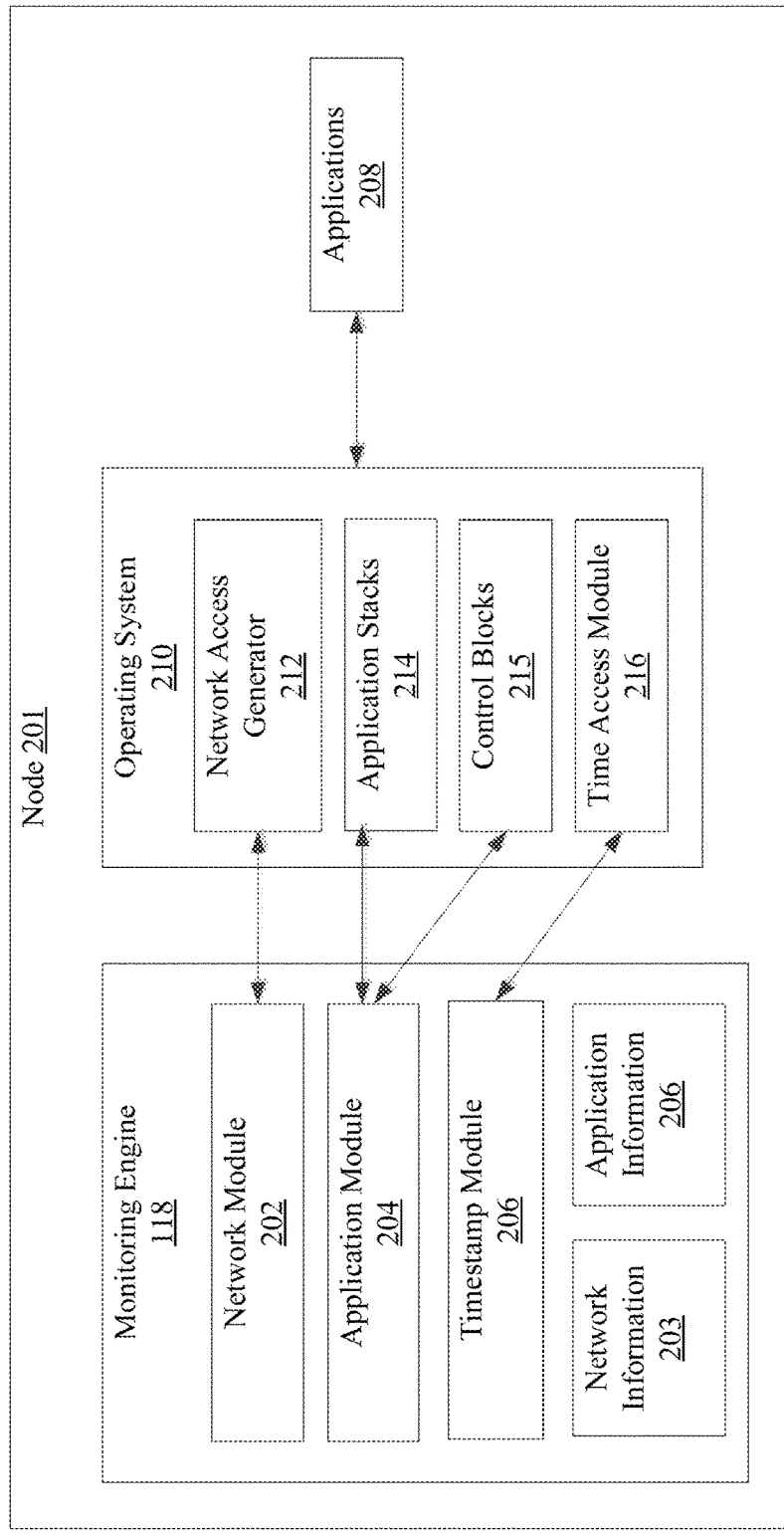
FIG. 2 is a diagram of a monitoring engine, according to an embodiment.

FIG. 2 is a block diagram 200 of a monitoring engine, according to an embodiment. As described above, the monitoring engine 118 may be installed as a software or hardware component on client devices 104, servers 106, or network devices 107 in FIG. 1, collectively referred to as node 201 in FIG. 2.

In an embodiment, monitoring engine 118 includes a network module 202, an application module 204, and a timestamp module 206. The monitoring engine 118 uses the network module 202, application module 204, and timestamp module 206 to monitor network information of the flows that are received and transmitted at node 201 and application information of applications 208 that execute on node 201 and generate or request the flows. Example applications 208 may be applications 108, 110, or 112 in some embodiments.

In an embodiment, as applications 208 execute on the node 201, applications 208 accesses hardware and software resources of node 201 using an operating system 210. Operating system 210 may be computer software that manages hardware and software resources of node 201, including task scheduling, processor time devoted to each application 208, and memory management, network management, etc., that is available for use by applications 208.

In an embodiment, network module 202 monitors network activity of node 201. For example, network module 202 collects network information associated with a flow when a network port is opened for the flow to be transmitted over network 102 and when a network port is opened so that a flow is received from network 102. Example network information may include an IP source address, an IP destination address, a source port, a destination port, a transport protocol used, and a number of bytes transmitted or received over the network 102. In an embodiment, transport protocol may correspond to a protocol used to transmit the flow, such as a user datagram protocol (UDP) or a transmission control protocol (TCP), and the transport protocol may be a UDP port or a TCP port in some examples.

In an embodiment, an IP source address is an address of node 201 that initiates the flow, and an IP destination address is an address of node 201 that is the destination of the flow. Example IP source address or IP destination address may be a numerical address that is associated with node 201 or a router that is associated with node 201. Further, the format and numerical values of the IP source address or IP destination address may depend on the IP protocol version, such as a 32-bit IPv4, 128-bit IPv6, or other protocol versions that are known in the art. Further IP source address or IP destination address may be assigned to node 201 at the time of manufacturing or configuration. In an exemplary embodiment, the IP source address or an IP destination address may be in a numerical format such as X.Y.Z.W, where X, Y, Z, and W are integers from 0 to 255.

In an embodiment, a port, whether a source port or destination port may be a number, such as a 16-bit number, though the implementation is not limited to this embodiment. In a further embodiment, the 16-bit number may be an unsigned integer.

In an embodiment, a source port identifies a port that initiates a flow over network 102 at a request of application 208. As such, a flow originating at node 201 will leave node 201 through the source port.

In an embodiment, a destination port identifies a port that receives a flow over network 102. As such, the flow received at node 201 will enter node 201 through the destination port.

In an embodiment, operating system 210 includes a network access generator 212. Network access generator 212 may determine IP source address and source port for a flow. In an embodiment, network access generator 211 may retrieve the IP source address of node 201 from a memory associated with node 201 and may allocate one of source ports of node 201 to application 208 that generates a message included in the flow.

In a further embodiment, network address generator 212 also retrieves the IP destination address and IP destination port for node 201 that is a destination for the flow. For example, network address generator 212 may retrieve the IP destination address from application 208 that generated the flow and communicate with the destination node to determine the destination port, using, for example, a hand-shake protocol. In a further embodiment, network access generator 212 may format the messages from applications 208 into packets according to a protocol specified by one of application 208 and cause the operation system 210 to initiate a process for transmitting the flow over network 102. For example, the network address generator 212 may populate packets with network information and data from one of application 208. In an embodiment, the packets may include a header and data area, and the network address generator 212 may populate the header with the network information, such as the IP source address, the IP destination address, the source port, the destination port, and the port type that is associated with the protocol, and the data area with the messages or data from application 208.

In an embodiment, network access generator 212 may also communicate with network module 202 of the monitoring engine 118. As part of the communication, network module 202 may retrieve the IP source address, the IP destination address, the source port, the destination port, and the port type information from the network access generator 212. In another example, network access generator 212 may transmit one of the packets in the flow or a copy of the packets to the network module 202, and the network module 202 may retrieve the network information, including the IP source address, the IP destination address, the source port, the destination port, and the port type information from the packets.

In an embodiment, once network module 202 retrieves the network information, the network module 202 may store the network information as network information 203. In one embodiment, monitoring engine 118 may store the network information 203 on node 201 within memory allocated to the monitoring engine 118. In an alternative embodiment, monitoring engine 118 may store network information 203 in a central data repository or as data in database 114 that was discussed in FIG. 1.

In an embodiment, application module 204 monitors activity of applications 208 executing on node 201. For example, as applications 208 execute and utilize resources of node 201, applications 208 spawn one or more processes and/or threads. In an embodiment, operating system 210 generates one or more application stacks 214 for processes spawned by the applications 208 and for threads that are spawned inside the processes. In a further embodiment, there may be two applications stacks 214 for each process or thread, one stack for the user mode and one stack for a kernel mode of the operating system 210. Also, the one or more application stacks 214 are regions of memory in node 201 that are accessible via the operating system 210.

In an embodiment, the threads, processes and the operating system 210 uses application stacks 214 to add and remove data, such as data processed by the one of applications 208, store function arguments (if any), address of the next instruction to execute after the function once the function is processed, execution code, etc. For example, when a function call of a function associated with application 208 is made, the argument for the function and/or the address of the next instruction to execute after the function completes may be stored in the application stack 214. In another example, when a function call of a function associated with application 208 is made, the address of the next instruction to execute after the function completes may be stored in the application stack 214, as the arguments for the function may be stored in the CPU registers. In a further embodiment, the processes, threads, etc., may add or remove data to the application stack 214 in a last-in-first-out (LIFO) manner, such that the data that was last added to the application stack 214 is the first data to be removed from the application stack 214, though the implementation is not limited to this embodiment.

In yet a further embodiment, as applications 208 execute and spawn processes and threads, operating system 210 stores the information related to the executing applications 208, processes and threads in one or more control blocks 215. Control blocks 215 may be data structures that are stored in memory of node 201. Example information stored in the control blocks 215 may include an ID of application 208, process ID or thread ID of processes and threads that are spawned by the applications 208. In a further embodiment, there may be separate control blocks 215 for process related information and thread related information that is associated with each application 208, such that one of control blocks 215 called a process control block stores the process information, and a second one of control blocks 215 called a thread control block the stores thread information. Further, control blocks 215 may also store pointers to each of the application stacks 214 that are utilized by the processes and threads of application 208.

In an embodiment, the application module 204 may access application stacks 214 and control block 215 and retrieve application information. For example, application module 204 may retrieve application ID, process ID, and thread ID from control blocks 215, In another example, application module 204 may trace application stacks 214 of threads and processes and retrieve names of function calls, function arguments (if any), sections of source code, instructions that follow the function completion, etc., from the application stacks 214. In a further embodiment, application module 204 may retrieve the application information each time network module 202 receives network information from network access generator 212, each time application 208 requests port access to receive or transmit a flow, or at predefined time intervals.

In an embodiment, once application module 204 retrieves the application information, the application module 204 may store the application information as application information 205. In an embodiment, monitoring engine 118 may store the application information 205 on node 201 and within memory allocated to the monitoring engine 118 which may be one of memories described in FIG. 6. In an alternative embodiment, monitoring engine 118 may store network information 203 in a central repository, a different server, or as data in database 114 that was discussed in FIG. 1.

In an embodiment, the timestamp module 206 records the time on node 201 during which network access generator 212 generates network information for the flow and/or application 208 requested network access using processes, threads, etc., executing using the application stacks 214. The timestamp module 206 may record the time in seconds, milliseconds, nanoseconds, etc. In an embodiment, the time may be recorded via a timestamp which is a current time of an event that is recorded by the node 201. In an embodiment, each node 201 may be programed with an initial time by a system administrator or an outside application. The operating system 210 may include a timestamp access module 216 that retrieves the timestamp from node 201 when requested by other applications, such as the timestamp module 206. Once the timestamp module 206 retrieves the timestamp, the timestamp module 206 associates the timestamp with or includes the timestamp into the network information 203 and/or the application information 205. In a further embodiment, the timestamp module 206 may also convert timestamps taken at node 201 into a Unix-time format or a coordinate universal time (UTC) format to account for various time zones where node 201 may execute. In yet a further embodiment, timestamp module 206 may also account for time differences between multiple nodes 201 in network 102 by synchronizing the time on node 201 using the Network Time Protocol (NTP) or by calculating the difference between the time of node 201 and the time on a master node, such as a node that hosts a master monitoring engine (described below).

Once monitoring engine 118 collects network information 203 and application information 205, monitoring engine 118 can correlate the network information 203 and application information 205 and identify which one of applications 208 has generated or received a flow. Further, because application information 205 may also include an application ID, thread ID, process ID, names of the function calls, and/or sections of the source code of the application 208, the monitoring engine 118 may determine which thread, process, function, etc., of application 208 generated the flow.

Figure 3A:
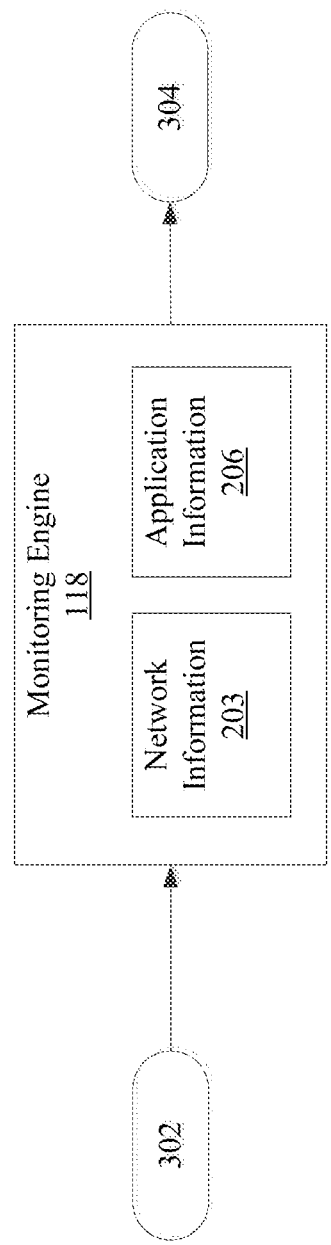
FIG. 3A is a block diagram of a monitoring engine that determines an anomaly in a network, according to an embodiment.

In an embodiment, monitoring engine 118 may use the network information 203 and application information 205 to determine which application 208 creates anomaly in network 102. FIG. 3A is a block diagram 300A of a monitoring engine that determines an anomaly in a network, according to an embodiment. For example, monitoring engine 118 may receive a request message 302 that includes network information associated with the anomaly in the network. The request message 302 may originate from client device 104 used by the system administrator, though the implementation is not limited to this embodiment. Example network information may include an IP source address, source port, IP destination address, destination address, transport protocol, timestamp or any of the above. A timestamp in the request message 302 may be the time that the anomaly was detected in network 102. Upon receipt, monitoring engine 118 may search the network information 203 that corresponds to the network information in the request message 302. If the corresponding network information 203 is found, monitoring engine 118 correlates the network information 203 with the application information 205 to determine which application, process, thread, etc., generated the anomaly in the network 102.

In an embodiment, monitoring engine 118 may generate a response message 304. The response message 304 may include application information, which includes application ID, function call, section of the source code, process ID, thread ID, etc., of application 208 that corresponds to the network information received in the request message 302. In a further embodiment, the data in the message response may be displayed on the display screen of a computing device, such as one of client devices 104, so that a systems administrator may identify an application that caused an anomaly in network 102, terminate the application manually or via a script, or take another action that rectifies the anomaly in network 102.

Figure 3B:
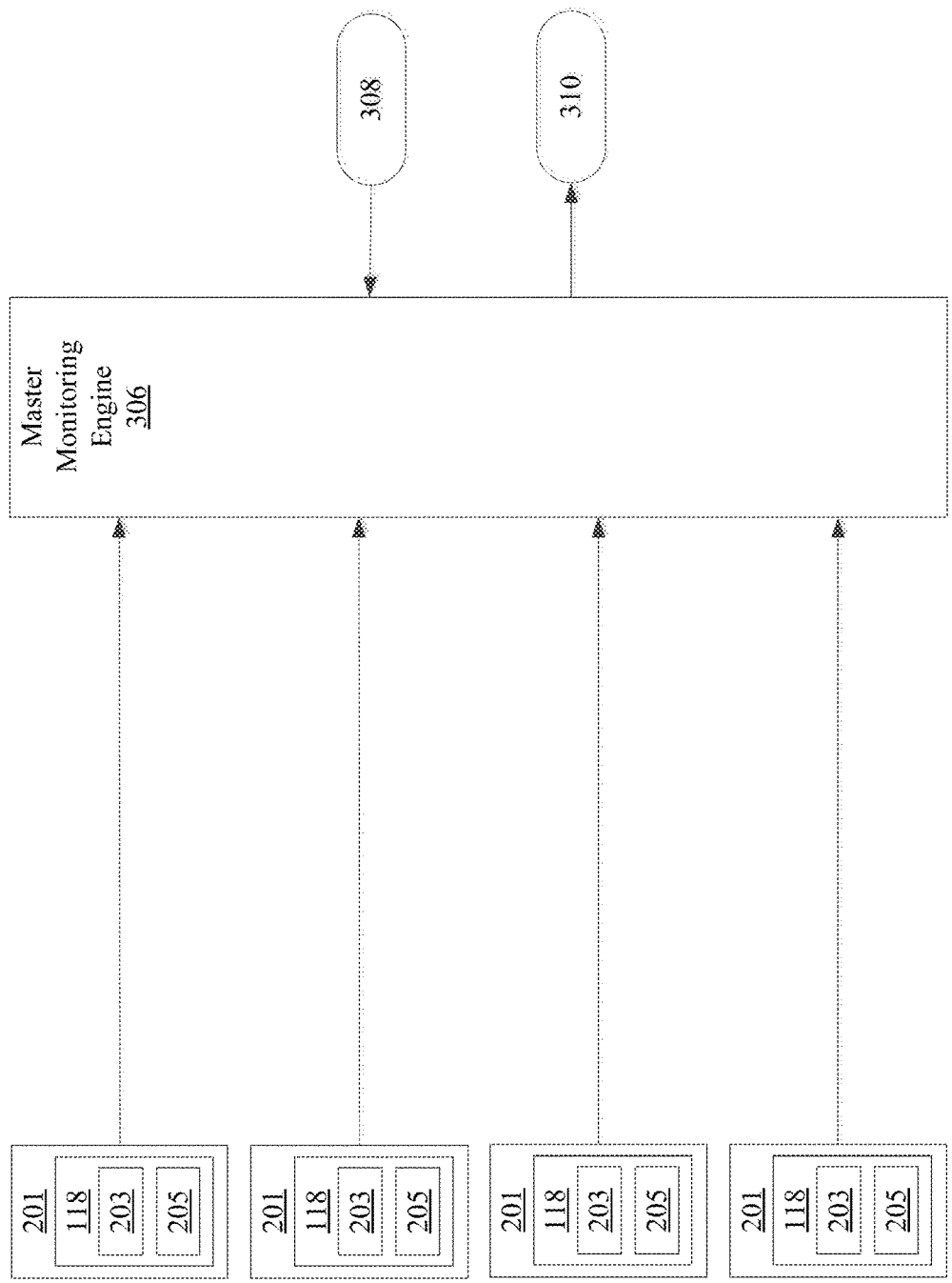
FIG. 3B is a block diagram of a master monitoring engine that identifies an application that causes an anomaly in a network, according to an embodiment.

FIG. 3B is a block diagram 300B of a master monitoring engine identifying an application that causes an anomaly in a network, according to an embodiment. As illustrated in FIG. 3B, multiple nodes 201 include monitoring engines 118, one monitoring engine 118 per node 201.

Block diagram 300B includes a master monitoring engine 306. Master monitoring engine 306 may execute on one of the computing devices discussed in detail in FIG. 1. In block diagram 300B, master monitoring engine 306 receives network information 203 and application information 205 from multiple nodes 201. The master monitoring engine 306 stores the network information 203 and application information 205 in a database (such as database 114) or another memory storage that is accessible to the master monitoring engine 306. In a further embodiment, master monitoring engine 306 also stores the credentials of nodes 201 that have generated the network information 203 and application information 205. In another embodiment, master engine 306 may derive the credentials of node 201 from the network information 203.

In an embodiment, master monitoring engine 306 receives a request message 308. The request message 308 may be similar to the request message 302 described in FIG. 3A, and includes network information of an observed anomaly in network 102. In a further embodiment, the request message 308 may be generated on one of client devices 104 used by a system administrator.

In response to the request message 308, master monitoring engine 306 uses the network information included in the request message 308 to determine application information 205 of one or more nodes 201 that may have generated an anomaly in network 102. For example, master engine 306 determines network information 203 that matches some or all network information in the request message 308 and then retrieves the application information 205 that corresponds to the network information 203.

In an embodiment, master monitoring engine 306 generates a response message 310. The response message 310 is similar to the response message 304 discussed in FIG. 3A, and may include some or all network information 203 and some or all application information 205. In a further embodiment, master monitoring engine 306 may transmit the response message 310 for display on a computing device that hosts the master monitoring engine 306 or client device 104 used by the system administrator.

Figure 4:
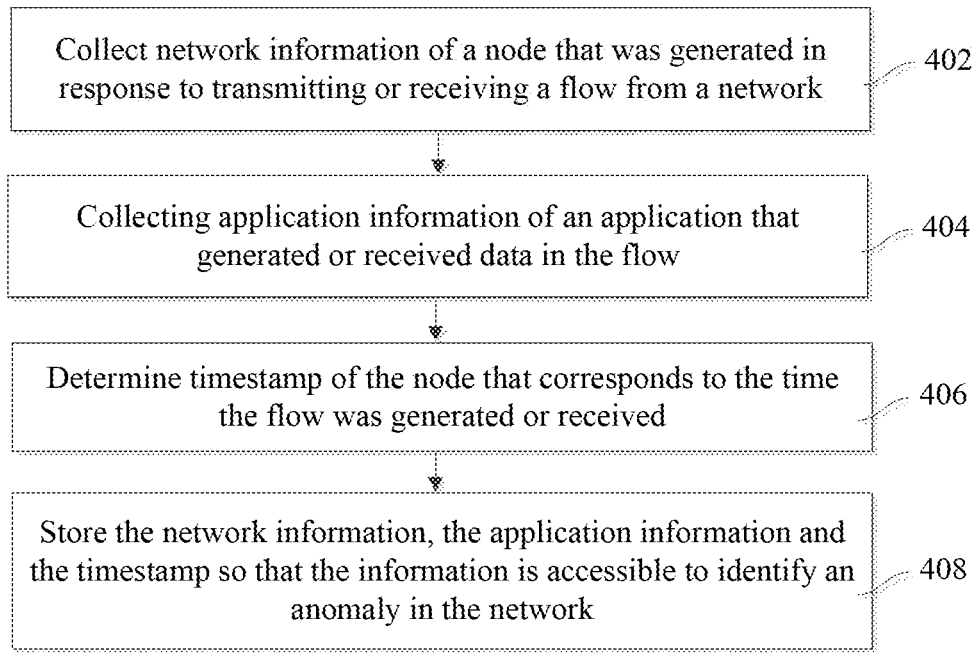
FIG. 4 is a flowchart of a method for collecting network information and application information from a node, according to an embodiment.

FIG. 4 is a flowchart of a method 400 for collecting network information and application information from a node, according to an embodiment. Method 400 may be implemented using hardware and software components described in FIGS. 1-2 and 3A-3B.

At operation 402, network information is collected. For example, network module 202 of monitoring engine 118 collects network information, including the IP source address, IP destination address, source port and destination port information on node 201 for each flow that is generated from node 201 or received by node 201. Additionally, network module 202 also collects the type of port which corresponds to the transport protocol, such as UDP or TCP that transports a flow over network 102.

At operation 404, application information is collected. For example, application module 204 of network engine 118 collects application information of application 208 that generates or receives the flow. For instance, application module 204 accesses the application stacks 214 and control blocks 215 of the current running thread from the operating system 210 and retrieves the application information from the application stacks 214 and control blocks 215. As discussed above, example application information may be an application ID, process ID, thread ID, function name, function arguments (if any), instructions that follow the function completion, or section of code that requested network access for the flow, etc.

At operation 406, timestamp information is collected. For example, timestamp module 206 of the monitoring engine 118 determines the timestamp on node 210 during which the network information was generated on node 201 or requested by application 208. In an embodiment, operation 406 may occur in conjunction with operation 402 and/or operation 404. In a further embodiment, the timestamp module 206 may incorporate the timestamp as part of the network information 203 and/or the application information 205.

At operation 408, the network information and the application information are stored. For example, monitoring engine 118 stores the network information 203, application information 205, and timestamp in the memory storage. As discussed above, the memory storage may be associated with monitoring engine 118. In another embodiment, network information 203 and the application information 205 may be transmitted to the master monitoring engine 306 that collects network information 203 and the application information 205 from multiple monitoring engines 118.

Figure 5:
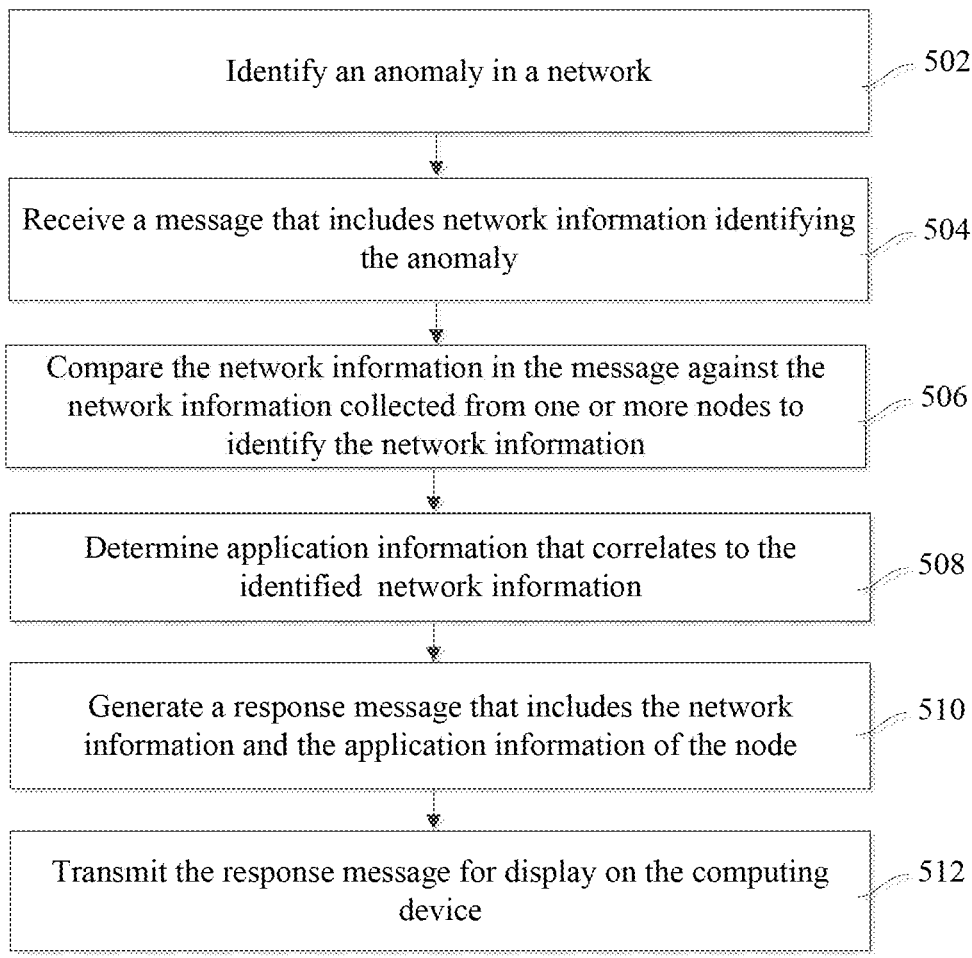
FIG. 5 is a flowchart of a method for determining which application causes an anomaly in a network, according to an embodiment.

FIG. 5 is a flowchart of a method 500 for determining which application causes an anomaly in a network, according to an embodiment. Method 500 may be implemented using hardware and software components described in FIGS. 1-2 and 3A-3B.

At operation 502, an anomaly in the network is identified. Example anomaly may be a bottleneck in network 102 created by multiple flows or by multiple flows that were transmitted/received by node 201 as a result of a cyberattack.

At operation 504, a request message with network information is received. For example, master monitoring engine 306 receives a request message 308 that includes network information identifying the anomaly. The network information may be network data that describes IP source address, IP destination address, source port, destination port, transport protocol, or any combination of the above. The data may also include a timestamp of the time that the anomaly was identified.

At operations 506-508, an application that caused an anomaly is identified. At operation 506, the network information in the request message 308 is compared against the network information from multiple nodes 201 that is stored in memory storage accessible to the master monitoring engine 306. The comparison may identify one or more network information 203 candidates. In a further embodiment, the timestamp included in the network information of the request message 308 may also be matched against the timestamp stored in the network information 203 for an exact or approximate time. An approximate time may be time that is less than the preconfigured time range from the timestamp stored with the network information 203. The timestamp may further narrow the network information 203 candidates to network information 203 of the flow that caused the anomaly.

At operation 508, an application is identified. For example, master monitoring engine 306 correlates the network information 203 to the corresponding application information 205 that monitoring engine 118 retrieved from node 201.

At operation 510, a response message is generated. For example, master monitoring engine 306 generates the response message 310. The response message 310 may include the network information 203 and application information 205.

At operation 512, the response message is transmitted. For example, the master monitoring engine 306 transmits the response message 310 to the client device 104 which displays the network information 203 and application information 205 on the display screen. Based on the information in the response message 310 the client device 104 may receive input from the system administrator to terminate the application 208 that corresponds to the network information 203 and application information 205.

Figure 6:
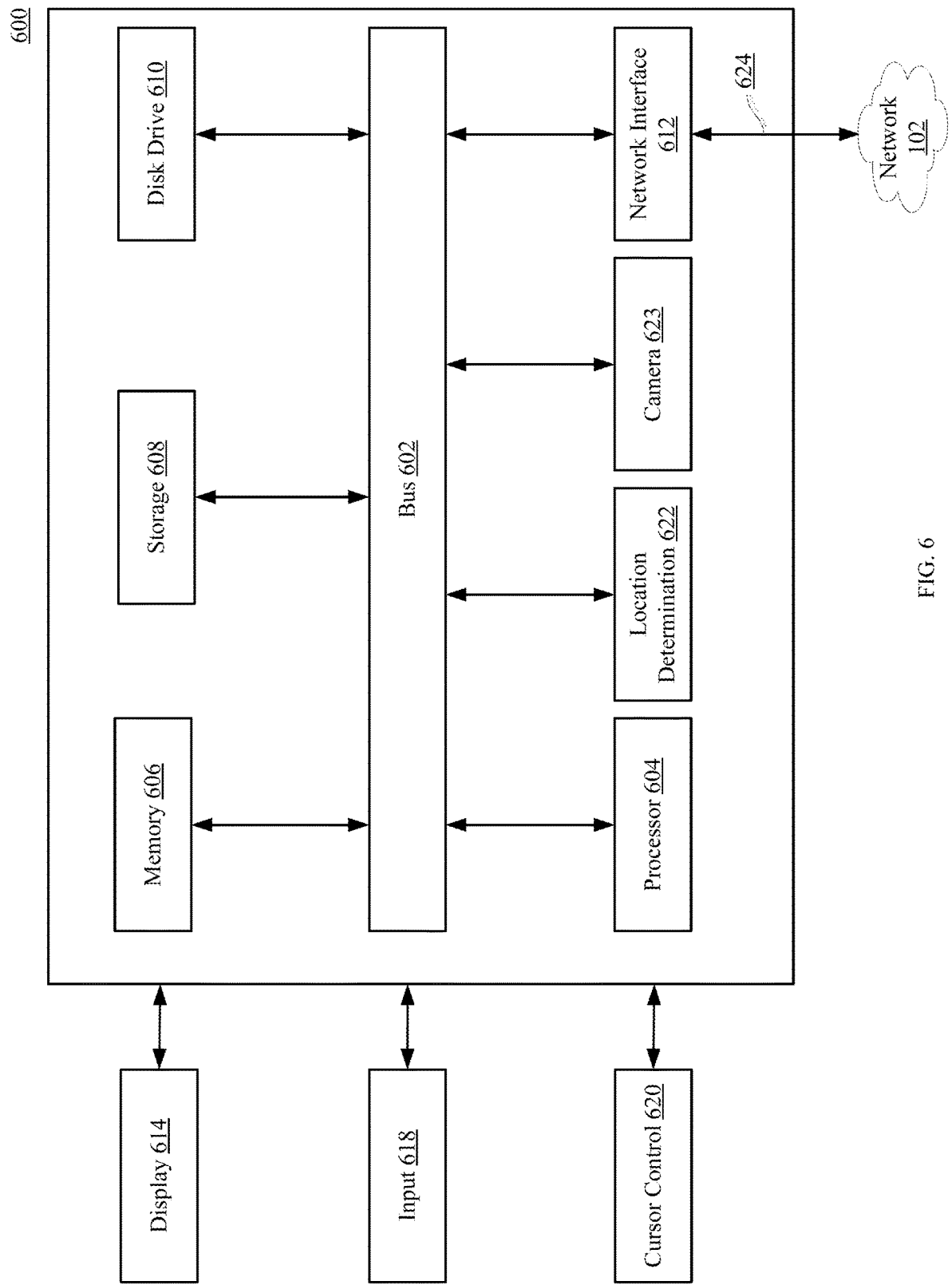
FIG. 6 is a schematic view illustrating an embodiment of a computing system.

Referring now to FIG. 6 an embodiment of a computer system 600 suitable for implementing, the systems and methods described in FIGS. 1-5 is illustrated.

In accordance with various embodiments of the disclosure, computer system 600, such as a computer and/or a server, includes a bus 602 or other communication mechanism for communicating information, which interconnects subsystems and components, such as a processing component 604 (e.g., processor, micro-controller, digital signal processor (DSP), FPGA, etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), a location determination component 622 (e.g., a Global Positioning System (GPS) device as illustrated, a cell tower triangulation device, and/or a variety of other location determination devices known in the art), and/or a camera component 623. In one implementation, the disk drive component 610 may comprise a database having one or more disk drive components.

In accordance with embodiments of the disclosure, the computer system 600 performs specific operations by the processor 604 executing one or more sequences of instructions contained in the memory component 606, such as described herein with respect to the mobile communications devices, mobile devices, and/or servers. Such instructions may be read into the system memory component 606 from another computer readable medium, such as the static storage component 608 or the disk drive component 610. In other embodiments, hard-wired circuitry may be used in place of or in combination with software instructions to implement the disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 600. In various other embodiments of the disclosure, a plurality of the computer systems 600 coupled by a communication link 624 to the network 134 (e.g., such as a LAN, WLAN, PTSN, and/or various other wired or wireless networks, including telecommunications, mobile, and cellular phone networks) may perform instruction sequences to practice the disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
collecting network information and corresponding timestamps from multiple nodes, wherein the network information is generated by the nodes transmitting or receiving a sequence of data packets from a network;
collecting application information from the multiple nodes, wherein the application information is associated with at least one application executing on one or more nodes of the multiple nodes;
receiving a message, wherein the message indicates an anomaly at a node in the multiple nodes and includes network information that corresponds to the anomaly and a message timestamp;
identifying network information candidates by comparing the network information in the message to the network information from the multiple nodes;
identifying a narrowed set of network information candidates by comparing the message timestamp to corresponding timestamps of the identified network information candidates;
correlating the narrowed set of network information candidates to the application information collected at the node; and
identifying, based on the correlating, an application in the at least one application associated with the anomaly.

2. The system of claim 1, wherein the network information includes a destination port or a transport.

3. The system of claim 1, wherein the message timestamp is associated with a time that the network information was created.

4. The system of claim 1, wherein the application information includes a function call.

5. The system of claim 1, wherein the application information from the multiple nodes is collected from a plurality of application stacks associated with a thread.

6. The system of claim 1, wherein the node is a server that transmits a flow over the network.

7. A method, comprising:
receiving a message, wherein the message indicates an anomaly at a node and includes network information associated with a flow that corresponds to the anomaly and a message timestamp;
identifying network information candidates by comparing the network information in the message to network information associated with flows that are transmitted from nodes in a network;
identifying a narrowed set of network information candidates by comparing the message timestamp to corresponding timestamps associated with the identified network information candidates;
correlating the narrowed set of network information candidates to application information collected from the nodes, wherein the application information is associated with at least one application that caused transmission of the flows from the nodes; and
based on the correlating, identifying an application in the at least one application associated with the flow that caused the anomaly.

8. The method of claim 7, wherein the application information associated with the at least one application includes a timestamp of a time when the application requested a transmission of the flow and a thread ID.

9. The method of claim 7, wherein the network information associated with the flows includes a timestamp of a time when a server in the network generated the network information associated with the flows and at least a transport protocol.

10. The method of claim 7, wherein the application information associated with the at least one application is collected from a plurality of application stacks associated with a thread or a process spawned by the application.

11. The method of claim 7, wherein the application information associated with the at least one application is collected from an operating system executing on a server in the network.

12. The method of claim 7, further comprising:
transmitting the application information associated with the at least one application and the network information associated with the flows to a central server, wherein the central server receives and stores application information and network information.

13. The method of claim 7, further comprising:
collecting the network information from a server, wherein the network information is associated with the flows transmitted from nodes in the network; and
collecting the application information from the server, wherein the application information is associated with the at least one application that caused the server to transmit the flows.

14. A system, comprising:
a non-transitory memory storing instructions; and
one or more hardware processors coupled to the non-transitory memory and configured to read the instructions from the non-transitory memory to cause the system to perform operations comprising:
receiving a request message indicating an anomaly in a network, wherein the request message includes network information associated with the anomaly and a message timestamp;
comparing the network information from the request message with network information collected from flows transmitted in the network;
identifying, based on the comparing, network information candidates;
identifying a narrowed set of network information candidates by comparing the message timestamp to corresponding timestamps of the identified network information candidates;
correlating the narrowed set of network information candidates with application information associated with an at least one application executing within the network and causes the network to transmit the flows; and
based on the correlating, determining an application from the at least one application that caused the anomaly.

15. The system of claim 14, wherein the network information collected includes at least one of an internet protocol (IP) source address or a transport protocol.

16. The system of claim 14, wherein the application information includes at least one of a process identifier (ID) or a function call.

17. The system of claim 14, wherein the determining further comprises:
   determining, using the application information, a function in the application that generated a flow.

18. The system of claim 14, wherein the determining further comprises:
   determining, using the application information, a thread in the application that generated a flow.

19. The system of claim 14, wherein the operations further comprise:
   collecting the network information and the application information at a monitoring engine in the network that is separate from at least one server that generated the network information and the application information.

20. The system of claim 14, wherein the application information associated with the at least one application includes a timestamp of a time when the application requested a transmission of the flow and a thread ID.

* * * * *

UNITED STATES PATENT AND TRADEMARK OFFICE
CERTIFICATE OF CORRECTION

| | |
|---|---|
| PATENT NO. | : 11,363,046 B2 |
| APPLICATION NO. | : 16/876306 |
| DATED | : June 14, 2022 |
| INVENTOR(S) | : Shlomi Boutnaru |

It is certified that error appears in the above-identified patent and that said Letters Patent is hereby corrected as shown below:

On the Title Page

Item [72], replace Inventor's name "Shiomi" with "Shlomi"

Signed and Sealed this
Sixth Day of September, 2022

Katherine Kelly Vidal
*Director of the United States Patent and Trademark Office*